US005656993A

United States Patent [19]
Coulthard

[11] Patent Number: 5,656,993
[45] Date of Patent: Aug. 12, 1997

[54] VEHICLE WHEEL CONDITION MONITOR AND DATA STORAGE SYSTEM

[75] Inventor: John J. Coulthard, Scottsdale, Ariz.

[73] Assignee: Semisystems, Inc., Scottsdale, Ariz.

[21] Appl. No.: 436,167

[22] Filed: May 8, 1995

[51] Int. Cl.$^6$ ................................................ B60C 23/00
[52] U.S. Cl. ........................... 340/442; 340/445; 73/146.5
[58] Field of Search ..................................... 340/442, 445,
340/447, 431; 73/146.4, 146.5, 146.8

[56] References Cited

U.S. PATENT DOCUMENTS

| | | | |
|---|---|---|---|
| 4,529,961 | 7/1985 | Nishimura et al. | 340/447 |
| 4,742,857 | 5/1988 | Gandhi | 152/418 |
| 4,978,941 | 12/1990 | Brown | 340/447 |
| 5,109,213 | 4/1992 | Williams | 340/447 |
| 5,231,872 | 8/1993 | Bowler et al. | 73/145 |
| 5,263,524 | 11/1993 | Boardman | 340/442 |
| 5,289,160 | 2/1994 | Fiorletta | 340/442 |
| 5,463,374 | 10/1995 | Mendez et al. | 340/442 |
| 5,473,938 | 12/1995 | Handfield et al. | 340/445 |

*Primary Examiner*—Jeffrey Hofsass
*Assistant Examiner*—Mohammed R. Ghannam

*Attorney, Agent, or Firm*—Cahill, Sutton & Thomas P.L.C.

[57] ABSTRACT

A tire monitor includes a pressure sensor, a temperature sensor, an A/D converter, and a microprocessor. The microprocessor has a sleep mode for conserving power and an output of the microprocessor controls the power applied to the pressure sensor and to the temperature sensor. A modulator and antenna are coupled to the microprocessor for transmitting data from the tire. Coupling between a monitor and a receiver is enhanced by extending a receiving antenna downwardly from the chassis of the vehicle, e.g. from the frame of a tractor.

The tire monitor is fabricated on a small printed circuit board with terminals for programming or encoding each monitor with a unique identification code during manufacture of the monitor. Terminals are also provided for disabling the transmitter with a jumper until the monitor is installed in a tire. The jumper is removed upon installation but the transmitter is further prevented by the microprocessor from transmitting until the pressure in a tire first exceeds a predetermined pressure. Transmissions occur at widely spaced intervals and the spacing depends on the content of the data. The number of times that the data is repeated within a transmission is also a function of the content of the data.

3 Claims, 1 Drawing Sheet

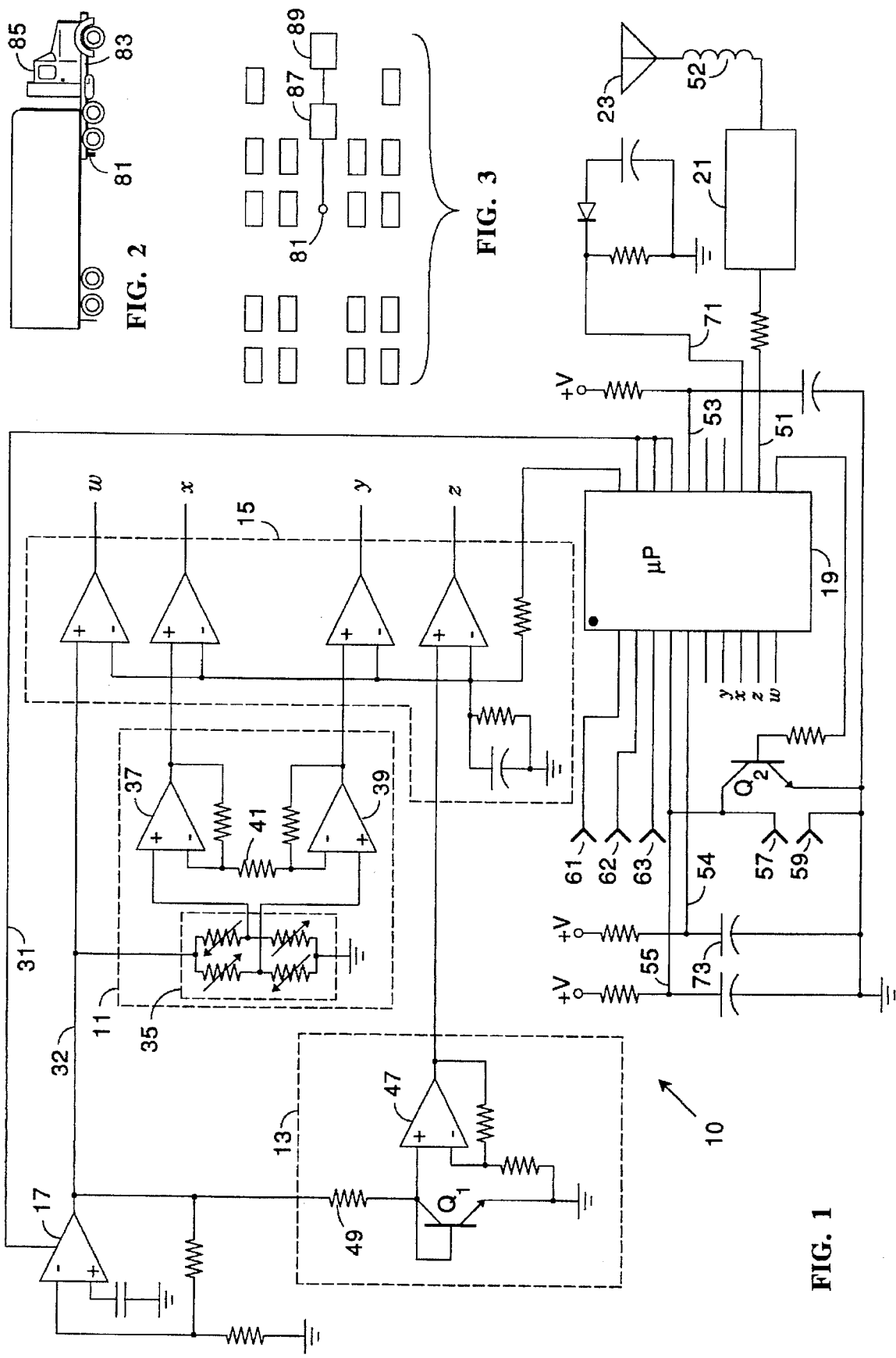

VEHICLE WHEEL CONDITION MONITOR AND DATA STORAGE SYSTEM

BACKGROUND OF THE INVENTION

This invention relates to systems for electronically monitoring the condition of a tractor-trailer and, in particular, to a monitor contained in each tire on a tractor-trailer.

Truck tires, unlike passenger car tires, are designed for high mileage, e.g. 200,000 miles per tire. There are some trade-offs in such a design. One trade-off is that a truck tire has a much harsher ride than a tire for a passenger car. Another trade-off is that a truck tire has a very narrow range of optimum pressure and the optimum pressure changes with load (an empty trailer should have tires at a lower pressure than a full trailer). Re-tread tires commonly used in the trucking industry have a particularly narrow range of optimum pressure.

There are known tire monitoring systems for tractors, trailers, and construction vehicles use dedicated electronics to identify each tire. For example, U.S. Pat. No. 5,109,213 (Williams) discloses a system in which a small transmitter is attached to the outside of a wheel. A DIP (dual in-line package) switch in each transmitter permits one to identify each wheel uniquely. If a wheel is replaced or if tractors and trailers are mixed and recombined, e.g. in double trailer units, then the monitoring system will not function correctly unless each wheel is re-coded. Each wheel's identification code must be loaded manually by way of the DIP switch, a tedious task. Manually setting codes is highly undesirable because it increases the down-time of a trailer and increases the cost of using the trailer.

U.S. Pat. No. 4,978,941 (Brown) discloses a tire monitoring system in which a receiver is located near each tandem axle on a tractor-trailer for detecting low power transmissions from transmitters in each wheel hub. Each wheel is not uniquely identified but the choice is narrowed by the proximity of a receiver to the suspect tires.

U.S. Pat. No. 4,742,857 (Gandhi) discloses a tire monitoring system in which a microprocessor tracks consecutive readings to determine trends and corrects tire pressure readings for temperature. U.S. Pat. No. 5,231,872 (Bowler et al.) also discloses a tire monitoring system in which tire temperature and tire pressure are measured. In the Bowler et al. system, all tires on a trailer have the same identification number which obliges the driver to inspect a group of tires to determine the problem, if any.

Tire monitors of the prior art use a small transmitter to communicate with a computer elsewhere in the vehicle. The electrical environment of a tractor-trailer is not conducive to effective communication. Not only are the wheels and chassis of a vehicle electrical ground, steel belts in the tires act as an electromagnetic shield to transmissions from the wheel. The electrical system of most vehicles is noisy due to the operation of a generator or an alternator and due to static discharges.

One can increase the power of the signal transmitted by a tire monitor but this significantly reduces the life of the battery powering the monitor. Known tire monitors are typically mounted on the outside of a wheel because the life of the battery in the monitor is shorter than the expected life of the tire. It is desired that the battery for a tire monitor have a life exceeding the life of the tire. It is also desired to improve the efficiency of a tire monitoring system by improving the RF coupling between the tire monitors and a receiver.

Radio transmissions from a tire monitor when a wheel is not in service also reduce the life of the battery. An on-off switch on a tire monitor can be set to the wrong position accidentally and is subject to mechanical failure due to vibration, impact, temperature extremes, or moisture. Installing a battery when a tire is put into service is not practical and is impossible when the monitor is inside a tire.

Tire monitors of the prior art that uniquely identify each tire typically transmit infrequently in order to conserve battery power and in order to avoid "collisions" with transmissions from monitors in other tires on a vehicle. This system works unless the condition of a tire deteriorates rapidly and the driver needs to know immediately that something is very wrong with a tire. There is a need for a tire monitor that can indicate an alarm condition and yet will last for the life of a tire if there is no damage to the tire.

In view of the foregoing, it is therefore an object of the invention to provide a tire monitor having a life equal to or greater than the expected life of a tire.

Another object of the invention is to provide a tire monitor that uniquely identifies the tire to which it is attached with a code furnished during manufacture of the tire monitor.

A further object of the invention is to provide a tire monitor that adapts to the condition of a tire by more closely monitoring the tire if the condition changes quickly.

Another object of the invention is to provide a tire monitoring system with improved coupling between the tires and a receiver.

SUMMARY OF THE INVENTION

The foregoing objects are achieved by this invention in which a tire monitor includes a pressure sensor, a temperature sensor, an analog to digital (A/D) converter, and a microprocessor. The microprocessor has a sleep mode for conserving power and an output of the microprocessor controls the power applied to the pressure sensor and to the temperature sensor. A modulator and antenna are coupled to the microprocessor for transmitting data from the tire. Coupling between a monitor and a receiving antenna is enhanced by extending the receiving antenna downwardly from the chassis of the vehicle, e.g. from the frame of a tractor.

The monitor is fabricated on a small printed circuit board with terminals for programming or encoding each monitor with a unique identification code during manufacture of the monitor. Terminals are also provided for disabling the transmitter with a jumper until the monitor is installed in a tire. The jumper is removed upon installation but the transmitter is further prevented by the microprocessor from transmitting unless the pressure in a tire first exceeds a predetermined pressure. Transmissions occur at widely spaced intervals to conserve battery power and the spacing depends upon the content of the data. A large change in the condition of a tire causes the transmitter to send an oft repeated message at closely spaced intervals.

BRIEF DESCRIPTION OF THE DRAWINGS

A more complete understanding of the invention can be obtained by considering the following detailed description in conjunction with the accompanying drawings, in which:

FIG. 1 is a schematic of a tire monitor constructed in accordance with a preferred embodiment of the invention;

FIG. 2 illustrates the location of a receiving antenna in accordance with the invention; and FIG. 3 is a schematic diagram of a tire monitoring system constructed in accordance with the invention.

DETAILED DESCRIPTION OF THE INVENTION

In FIG. 1, tire monitor 10 includes pressure sensing means 11, temperature sensing means 13, analogue to digital (A/D)

converter 15, and microprocessor 19. The analogue data from pressure sensing means 11 and temperature sensing means 13 is converted into digital data by A/D converter 15 and microprocessor 19. The data is then transmitted serially through modulator 21 and antenna 23.

Microprocessor 19 can be any microprocessor having a low power or "sleep" mode in which the microprocessor draws very little battery current. In one embodiment of the invention, microprocessor 19 was a "COP 8" processor as sold by National Semiconductor. In particular, a "COP 8782" microprocessor was used. This particular version of the microprocessor includes one-time programmable memory and RAM (random access memory). As illustrated in FIG. 1, a small dot marks pin one and the pins are numbered consecutively, proceeding counter clockwise around the rectangle.

In accordance with one aspect of the invention, outputs G0, G1, and G2 (pins 17–19) are tied together and provide an on/off switch for the analogue portion of the circuitry. Pins 17–19 are connected to line 31 which enables voltage regulator 17. The output from regulator 17, on line 32, provides a reference input for pressure sensing means 11, temperature sensing means 13, and A/D converter 15. Thus, before microprocessor 19 enters the low power state, regulator 17 is disabled and the analogue portion of tire monitor 10 is also shut down, thereby conserving a substantial amount of battery power.

Pressure sensing means 11 includes resistor bridge 35 having one diagonal connected between line 32 and ground and the ends of the other diagonal connected to the non-inverting inputs of amplifiers 37 and 39. In one embodiment of the invention, resistor bridge 35 was a silicon, solid state resistor bridge in which a single semiconductor chip contains all four resistors. The differential output from the bridge is relatively small and is increased by amplifiers 37 and 39. The differential output of resistor bridges varies considerably from chip to chip and this variation is compensated by resistor 41. Resistor bridges are tested and sorted into groups and a particular value for resistor 41 is provided for each group. By matching resistor 41 to resistor bridge 35, a resolution of one bit per psia (pound per square inch absolute) is obtained.

Temperature sensing means 13 includes transistor 45 and amplifier 47. Transistor 45 is a silicon junction transistor wired as a diode between the non-inverting input of amplifier 47 and ground. The collector of transistor 45 is coupled to line 32 by resistor 49. Transistor 45 and resistor 49 act as a temperature sensitive potentiometer. The variations in voltage at the junction of transistor 45 and resistor 49 are increased in magnitude by amplifier 47 and coupled to A/D converter 15 by line 49. The resolution of temperature sensing means 13, in one embodiment of the invention, was about 1° C. per bit.

A/D converter 15 is controlled by output G3 (pin 20) of microprocessor 19, in a manner known per se in the art, to convert the voltages from pressure sensing means 11 and temperature sensing means 13 into digital data representative of pressure and temperature. The digital data is stored in memory within microprocessor 19 and is sent serially over output 51 to modulator 21. Modulator 21 converts the digital signals into an FM modulated signal having a center frequency of either 433 Mhz or 418 Mhz in the bands assigned by the FCC for general purpose telemetry. Other approved bands could be used instead. The output from modulator 21 is coupled by tuning coil 52 to antenna 23. Tire monitor 10, including antenna 23, is contained with a tire and attached to a wheel, preferably as described co-pending application Ser. No. 08/417,514, filed Apr. 3, 1995, and assigned to the assignee of this invention.

Three RC timer circuits are shown in FIG. 1. Input 53 to microprocessor 19 is a power-on reset, i.e. the microprocessor is reset when a battery is first connected to the tire monitor. Input 54 is the clock input to microprocessor 19. The clock frequency is controlled by the RC circuit and, in one embodiment of the invention, the clock frequency was two megahertz. Input 55 is the sleep timer input in which a low voltage on input 55 causes microprocessor 19 to enter the low power or sleep mode.

Transistor $Q_2$ is connected between input 55 and ground. The base of transistor $Q_2$ is coupled to output L4 (pin 11) of microprocessor 19. Jumper terminals 57 and 59 are also connected between input 55 and ground. Terminals 57 and 59 are used during the assembly for testing the tire monitor. After initial assembly and test, a temporary jumper in inserted into terminals 57 and 59, grounding input 55 and forcing microprocessor 19 into a low power mode even after a battery is attached to the monitor.

Contacts 61, 62, and 63 provide access to pins 1, 2, and 3 of microprocessor 19. Contacts 61, 62, and 63 are used during final assembly of tire monitor 10 for operating the monitor under the control of an external test device. Input line 71 is connected to input L6 (pin 13 of microprocessor 19). A logic "high" voltage (greater than 3.5 volts) on line 71 causes the microprocessor to perform a data conversion and transmission once every five seconds. This mode of operation is used during the testing of the monitor and could be used as an emergency mode of transmission. This mode is not normally used because the continuous transmissions consume a great deal of battery power.

Microprocessor 19 can operate in several different modes of operation. A first mode of operation, with a jumper connected between contacts 57 and 59, is described above. This mode is used to increase the "shelf life" of the battery (not shown) powering tire monitor 10. The jumper interconnecting contact 57 and 59 is removed or opened when tire monitor 10 is mounted on a wheel.

A second mode of operation occurs after the jumper is removed. Capacitor 73 charges, eventually reaching a logic "high" voltage. Microprocessor 19 awakens and produces an output signal on line 31, enabling voltage regulator 17 and, thereby, enabling pressure sensing means 11, temperature sensing means 13, and A/D converter 15. Temperature and pressure are measured. If the sensed pressure is below a predetermined amount, e.g. 20 psi, then pin 11 is raised, turning on transistor $Q_2$ and returning microprocessor 19 to the low power mode.

The second mode is referred to herein as the "semi-sleep" mode and conserves battery power by preventing microprocessor 19 from transmitting data. Modulator 21 consumes far more power than the rest of the circuit and, by preventing data from being transmitted, battery power is conserved. This mode of operation permits one to attach tire monitor 10 to a tire that is not going into immediate service. If the pressure in a tire exceeds the predetermined pressure, a flag is stored in the memory of microprocessor 19 that prevents a subsequent low pressure from being ignored. That is, once the pressure in a tire exceeds the predetermined pressure, a subsequent low pressure is interpreted as a problem and the tire monitor reacts accordingly. Thus, a subsequent low pressure is not ignored.

Terminals 61, 62, and 63 are used for programming microprocessor 19, including storing a unique identification code that is transmitted along with temperature, pressure, and voltage data to a receiver. As illustrated in FIG. 1, output w from A/D converter 15 tells microprocessor 19 what the voltage is on reference line 32. Outputs x and y tell microprocessor 19 the pressure being sensed by resistor bridge 35, and output z tells microprocessor 19 the temperature sensed by transistor Q1. The data transmitted by microprocessor 19 thus includes an identification code and data representing voltage, pressure, and temperature.

In a third mode of operation, monitor 10 transmits data periodically and the period depends upon the content of the data, particularly the rate of change between successive readings. In one embodiment of the invention, the period for transmission was determined in accordance with the following table. Other values could be used, depending upon the particular application.

TABLE I

| Change | Convert | Transmit | Repeat |
|---|---|---|---|
| ≦3⅛% | every 600 sec | every 900 sec | 3 times |
| >3⅛% | every 600 sec | every 810 sec | 6 times |
| >6¼% | every 270 sec | every 270 sec | 12 times |
| >12½% | every 90 sec | every 90 sec | 25 times |
| >25% | every 30 sec | every 30 sec | 50 times |
| >50% | every 10 sec | every 10 sec | 100 times |

The number of times that the data is transmitted in a given burst of data depends on the content of the data, particularly the rate of change of data. This assures that, among randomly transmitting tire monitors, the tire monitor sensing the greatest problem is most likely to be detected and the least likely to be affected by transmission errors. For example, a receiver may require three consecutive transmissions of the same data in order to recognize the data as valid. Transmitting critical data twenty-five times in succession assures that three consecutive transmissions will likely be received and interpreted as containing the same data. Thus, the reliability and effectiveness of the transmission are improved in accordance with this aspect on the invention.

The reliability and effectiveness of the transmission are further assured by locating the receiving antenna under the chassis of the tractor, as illustrated in FIG. 2. In accordance with the invention, it is preferred that receiving antenna 81 extend downwardly from chassis 83 of tractor 85. This locates receiving antenna 81 approximately in the same plane as the tire monitors in the tires of a tractor trailer. As illustrated in FIG. 2, receiving antenna 81 is located toward the rear portion of chassis 83, thereby locating antenna 81 near the wheels of the trailer.

FIG. 3 schematically illustrates the location of receiving antenna 81 among the tires of a tractor trailer. Antenna 81 is coupled to receiver 87 which demodulates the FM signal from the tire monitors, producing digital data which is stored in computer 89 for further processing or for display.

The invention thus provides a tire monitor having a life equal to or greater than the life of a tire. The monitor uniquely identifies each tire and adapts to the condition of the tire by more closely monitoring the tire if the condition of the tire changes rapidly. Coupling between the monitor and a receiver are improved by changing the period between transmissions and by changing the number of times that the data is repeated within a transmission, both in accordance with the content of the data. Coupling is further improved by locating the receiving antenna in approximately the same plane as the transmitting antennas.

Having thus described the invention, it will be apparent to those of skill in the art that various modifications can be made within the scope of the invention, for example, other A/D converters can be used.

What is claimed as the invention is:

1. A wheel condition monitoring system comprising:
   (a) a pressure sensing means for producing a first electrical signal proportional to air pressure;
   (b) a temperature sensing means for producing a second electrical signal proportional to temperature;
   (c) a microprocessor having a low power mode of operation, wherein said microprocessor is coupled to said pressure sensing means and to said temperature sensing means for turning off said pressure sensing means and said temperature sensing means when said microprocessor is in the low power mode of operation and for turning on said pressure sensing means and said temperature sensing means when said microprocessor is not in the low power mode of operation;
   (d) a modulator coupled to said microprocessor for producing a modulated high frequency signal;
   (e) an antenna coupled to said modulator for transmitting said modulated high frequency signal;
   (f) said system having a plurality of conversion rates each associated with a range of change in a sensed temperature and a sensed pressure, each conversion rate having an unique transmission period associated therewith and a repeat number to determine the number of times that data is repeated during a transmission of said modulated high frequency signal.

2. A tire monitor comprising:
   (a) a pressure sensing means for producing a first electrical signal proportional to air pressure;
   (b) a temperature sensing means for producing a second electrical signal proportional to temperature;
   (c) a microprocessor having a low power mode of operation, wherein said microprocessor is coupled to said pressure sensing means and to said temperature sensing means for turning off said pressure sensing means and said temperature sensing means when said microprocessor is in the low power mode of operation and for turning on said pressure sensing means and said temperature sensing means when said microprocessor is not in the low power mode of operation; and
   (d) a first jumper terminal and a second jumper terminal coupled to said microprocessor, wherein said microprocessor enters said low power mode when said first jumper terminal is coupled to said second jumper terminal.

3. The tire monitor as set forth in claim 2 including a timer circuit coupled to said microprocessor for causing said microprocessor to exit said low power mode of the operation periodically and further including a first jumper terminal and a second jumper terminal coupled to said timer circuit for disabling said timer circuit when said first jumper terminal is coupled to second jumper terminal.

* * * * *